(12) United States Patent
Chevalier et al.

(10) Patent No.: US 9,666,381 B2
(45) Date of Patent: May 30, 2017

(54) ASYMMETRICAL SUPERCAPACITOR WITH ALKALINE ELECTROLYTE COMPRISING A THREE-DIMENSIONAL NEGATIVE ELECTRODE AND METHOD FOR PRODUCING SAME

(71) Applicant: SAFT, Bagnolet (FR)

(72) Inventors: Stephanie Chevalier, Bordeaux (FR); Melanie Dendary, Eysines (FR); Patrick Bernard, Bordeaux (FR)

(73) Assignee: SAFT, Bagnolet (FR)

( * ) Notice: Subject to any disclaimer, the term of this patent is extended or adjusted under 35 U.S.C. 154(b) by 83 days.

(21) Appl. No.: 14/772,811

(22) PCT Filed: Mar. 7, 2014

(86) PCT No.: PCT/EP2014/054445
§ 371 (c)(1),
(2) Date: Sep. 4, 2015

(87) PCT Pub. No.: WO2014/135678
PCT Pub. Date: Sep. 12, 2014

(65) Prior Publication Data
US 2016/0005549 A1 Jan. 7, 2016

(30) Foreign Application Priority Data

Mar. 8, 2013 (FR) ...................... 13 52108

(51) Int. Cl.
*H01G 11/70* (2013.01)
*H01G 11/24* (2013.01)
(Continued)

(52) U.S. Cl.
CPC ............ *H01G 11/24* (2013.01); *H01G 11/04* (2013.01); *H01G 11/28* (2013.01); *H01G 11/34* (2013.01);
(Continued)

(58) Field of Classification Search
None
See application file for complete search history.

(56) References Cited

U.S. PATENT DOCUMENTS 5,100,748 A * 3/1992 Doniat ................. H01M 4/32
205/60
2012/0300367 A1 11/2012 Chevalier et al.
(Continued)

FOREIGN PATENT DOCUMENTS

EP 2 429 020 A1 3/2012
EP 2 528 076 A2 11/2012

OTHER PUBLICATIONS

International Search Report for PCT/EP2014/054445 dated May 16, 2014.

*Primary Examiner* — Dion R Ferguson
(74) *Attorney, Agent, or Firm* — Sughrue Mion, PLLC

(57) ABSTRACT

An asymmetrical supercapacitor including an alkaline electrolyte, at least one separator, at least one positive electrode including a nickel-based hydroxide and a nickel-based current collector, and at least one negative electrode including a nickel-based current collector and having a porous three-dimensional structure. Some pores are open, the mean diameter of the open pores being greater than or equal to 100 μm and being less than or equal to 300 μm and two contiguous open pores (1, 2) communicate by at least one opening (5) the mean diameter of which is greater than or equal to 35 μm and less than or equal to 130 μm. The three-dimensional structure includes a mixture including at least one activated carbon, at least one electron-conducting additive, and a binding agent including at least one elastomer polymer and at least one thickening polymer.

15 Claims, 2 Drawing Sheets

(51) Int. Cl.
  *H01G 11/04* (2013.01)
  *H01M 12/00* (2006.01)
  *H01G 11/68* (2013.01)
  *H01G 11/28* (2013.01)
  *H01G 11/34* (2013.01)
  *H01G 11/38* (2013.01)
  *H01G 11/52* (2013.01)
  *H01G 11/58* (2013.01)
  *H01G 11/86* (2013.01)

(52) U.S. Cl.
  CPC ............ *H01G 11/38* (2013.01); *H01G 11/52* (2013.01); *H01G 11/58* (2013.01); *H01G 11/68* (2013.01); *H01G 11/70* (2013.01); *H01G 11/86* (2013.01); *H01M 12/005* (2013.01); *Y02E 60/13* (2013.01)

(56) References Cited

U.S. PATENT DOCUMENTS

| | | | | |
|---|---|---|---|---|
| 2013/0189592 | A1* | 7/2013 | Roumi | H01G 9/048 |
| | | | | 429/406 |
| 2014/0017577 | A1* | 1/2014 | Minami | H01M 4/9016 |
| | | | | 429/405 |
| 2014/0287302 | A1* | 9/2014 | Fukunaga | H01M 4/485 |
| | | | | 429/188 |
| 2015/0155107 | A1* | 6/2015 | Okuno | H01G 11/06 |
| | | | | 361/502 |
| 2016/0336118 | A1* | 11/2016 | Majima | H01G 11/06 |

* cited by examiner

ASYMMETRICAL SUPERCAPACITOR WITH ALKALINE ELECTROLYTE COMPRISING A THREE-DIMENSIONAL NEGATIVE ELECTRODE AND METHOD FOR PRODUCING SAME

CROSS REFERENCE TO RELATED APPLICATIONS

This application is a National Stage of International Application No. PCT/EP2014/054445 filed Mar. 7, 2014, claiming priority based on French Patent Application No. 13 52 108, filed Mar. 8, 2013, the contents of all of which are incorporated herein by reference in their entirety.

TECHNICAL FIELD

The technical field of the invention is that of asymmetrical supercapacitors, also known as hybrid, with an alkaline electrolyte and having a positive electrode made of nickel-based hydroxide and a negative electrode made of carbon deposited on a current collector.

PRIOR ART

The energy storage system known as "supercapacitor", also known as "supercapacitance" or else "Electrochemical Double Layer Capacitor (EDLC)", or else "ultracapacitor" is a device for storing energy by accumulating ions on two electrodes acting as ion collectors when a potential difference is imposed between them. The energy storage in a supercapacitor is hence electrostatic in origin, and not electrochemical as in the case of accumulators.

The term "supercapacitor" will be used in the remainder of the present document and it goes without saying that this term also denotes the equivalent technologies mentioned above.

An electrochemical supercapacitor comprises at least one positive electrode and at least one negative electrode. The two electrodes are separated by a separator. The electrochemical bundle formed by all the positive and negative electrodes and the separators is impregnated with an electrolyte. Generally, activated carbon having a high specific surface area (greater than 500 m$^2$/g) is deposited on the surface of the electrodes, which makes it possible to obtain very high capacitance values. A supercapacitor supplies an energy density of 4 to 6 Wh/kg, which is around 40 to 60 times greater than that of an electrolytic capacitor.

There are different variants of electrochemical supercapacitors.

A first variant was that of symmetrical supercapacitors with aqueous electrolytes. In this type of supercapacitor, the positive electrode and the negative electrode are composed of similar materials with the same capacitance. This is usually activated carbon. The patent application EP-A-1 883 937 describes the fabrication of an activated carbon electrode that can be used for the design of aqueous electrolyte symmetrical supercapacitors.

A second variant is that of non-aqueous electrolyte symmetrical supercapacitors. As described in U.S. Pat. No. 6,356,432, the supercapacitor comprises a non-aqueous electrolyte, such as acetonitrile, and two carbon electrodes. Furthermore, each electrode includes a binding agent and an electrochemically active material composed of activated carbon, the specific surface area of which is greater than 2000 m$^2$/g.

The third variant of supercapacitor is that of asymmetrical supercapacitors, also known as hybrid supercapacitors, with an aqueous electrolyte. The patent application EP-A-1 156 500 describes the general operating principle of this type of supercapacitor. Such a supercapacitor comprises an activated carbon negative electrode and a positive electrode, the active material of which can undergo reversible oxidization. The positive electrode is charged by a Faradic process whereas the negative electrode is charged by ion accumulation at the electrode/electrolyte interface to form a double electrical layer. The charge accumulation occurring at the negative electrode corresponds to a non-Faradic process.

A fourth variant of non-aqueous electrolyte asymmetrical supercapacitor is also known comprising a Faradic material either at the positive electrode or at the negative electrode.

The present invention more particularly relates to the third variant of supercapacitor, the operating principle of which is schematically represented in FIGS. 1 and 2. These figures illustrate an example of asymmetrical supercapacitor wherein the positive electrode $EL_1$ of capacitance $C_1$ is an electrode made of nickel-based hydroxide and the negative electrode $EL_2$ of capacitance $C_2$ is an activated carbon electrode. The positive electrochemically active material is a nickel-based hydroxide.

The positive and negative electrodes are separated by a separator that is a porous membrane imbued with an alkaline aqueous electrolyte such as KOH, and/or NaOH, and/or LiOH.

The capacitance $C_1$ of the positive electrode is proportional to the quantity of nickel-based hydroxide.

The capacitance $C_2$ of the negative electrode comes from the formation of a double electrical layer at the activated carbon/electrolyte interface. This double layer is composed firstly of a proportion of the accumulation of the $K^+$ ions of the electrolyte adsorbed on the surface of the activated carbon, and secondly of the accumulation of $e^-$ electrons in the activated carbon that compensate for the positive electrical charge created by the adsorption of the $K^+$ ions. The capacitance $C_2$ is proportional to the specific surface area of the activated carbon. The movement of the $K^+$ and $OH^-$ ions of the electrolyte has been represented during charging (FIG. 1) and discharging (FIG. 2).

An asymmetrical supercapacitor has several advantages over a symmetrical supercapacitor.

Firstly, it has greater capacitance. Specifically, if CT is the capacitance of a supercapacitor, this gives the equation: $1/CT=1/C_1+1/C_2$. In the case of a symmetrical supercapacitor, this gives $C_1=C_2$ hence $CT=C_1/2=C_2/2$. The capacitance of a symmetrical supercapacitor is thus equal to half the capacitance of one of the electrodes. In the case of an asymmetrical supercapacitor, the capacitance $C_1$ of the nickel-based hydroxide is far greater than the capacitance $C_2$ of the activated carbon electrode; hence the equation $C_1 \gg C_2$ and $CT=(C_1 \times C_2)/(C_1+C_2) \approx (C_1 \times C_2)/C_1 \approx C_2$. The capacitance of an asymmetrical supercapacitor is thus approximately equal to the smallest capacitance $C_2$, giving a capacitance gain of a factor of 2 compared to a symmetrical supercapacitor.

Secondly, an aqueous electrolyte asymmetrical supercapacitor can supply a voltage in the order of 1.7 to 1.8V whereas a symmetrical supercapacitor can generally only supply a voltage of less than 0.9V, giving an energy gain when compared with symmetrical supercapacitors.

One drawback of asymmetrical supercapacitors of the prior art is that their assembly requires the use of an activated carbon weave, such as a lightweight felt or woven carbon fibers. The activated carbon weave is wound around the current collector of the negative electrode. The assembly of the asymmetrical supercapacitors is complicated since it requires the handling and stacking of three parts: a positive electrode, a current collector and a carbon weave, the latter having to be wound around the current collector.

Another drawback of asymmetrical supercapacitors of the prior art comes from the use of polytetrafluoroethylene (PTFE) as binding agent of the negative electrode. Carbon-based active materials used in the prior art are mixed with PTFE. However, PTFE mixed with the carbon-based active material gives a mixture with the appearance of latex, which does not have good mechanical withstand on the current collector. A loss of conductivity is observed between the current collector and the mixture, leading to a drop in the capacitance throughout the operation of the supercapacitor.

The aim of the patent application FR 11 54681 of the Applicant is to replace the negative electrodes for hybrid supercapacitors composed of a carbon fiber weave resting on a planar current collector made of nickel. The current collector as described in the patent application FR 11 54681 has a specific roughness of 0.8 to 15 µm for a specific basic length between 2 and 200 µm. Furthermore, the ink made of activated carbon powder used to produce the negative electrode does not contain polytetrafluoroethylene (PTFE). However, a layer comprising carbon is present between the nickel-based direct current collector and the activated carbon powder mixture.

The aim of the invention is to improve the electrochemical performance of an asymmetrical supercapacitor, and in particular to increase the mass and volumetric capacitances of the electrode while keeping the electrode's excellent mechanical withstand.

SUMMARY OF THE INVENTION

The subject of the invention is an asymmetrical supercapacitor comprising:
- an alkaline electrolyte;
- at least one separator;
- at least one positive electrode comprising a nickel-based hydroxide and a nickel-based current collector; and
- at least one negative electrode.

The negative electrode comprising a nickel-based current collector and having a porous three-dimensional structure wherein:
- some pores are open, the mean diameter of the open pores being greater than or equal to 100 µm and being less than or equal to 300 µm; and
- two contiguous open pores communicate by at least one opening the mean diameter of which is greater than or equal to 35 µm and less than or equal to 130 µm.

Furthermore, said porous three-dimensional structure includes a mixture comprising:
- at least one activated carbon;
- at least one electron-conducting additive; and
- a binding agent comprising at least one elastomer polymer and at least one thickening polymer.

According to an embodiment of the invention, the volume occupied by the open pores accounts for at least 50% of the volume of the current collector, preferably at least 90% of the volume of the current collector, preferably at least 95% of the volume of the current collector.

Preferably, the current collector of the negative electrode has a thickness between 0.3 and 1 mm.

According to an embodiment, the greatest dimension of an open pore is greater than the greatest dimension of the opening connecting this pore to a contiguous open pore.

Preferably, the current collector of the negative electrode has a basis weight between 3 $g/dm^2$ and 6 $g/dm^2$.

According to a preferred embodiment of the invention, the mean diameter of the open pores is between 150 µm and 250 µm and the mean diameter of the openings is between 50 µm and 100 µm.

Preferably, the ratio of the greatest dimension of the open pore to the greatest dimension of the opening connecting this pore to a contiguous open pore is greater than 1.5.

According to an embodiment, the activated carbon has a specific active surface area greater than or equal to 500 $m^2/g$, preferably greater than or equal to 900 $m^2/g$.

Preferably, the activated carbon is in the form of particles with a diameter between 2 and 20 µm.

According to a preferred embodiment, the activated carbon includes a quantity of oxygen measured by X-ray fluorescence greater than 3 atomic %.

According to an embodiment, the electron-conducting additive is chosen from the group composed of carbon black, graphite, graphene, carbon fibers, carbon nanotubes and a mixture thereof.

Preferably, the binding agent is free of polytetrafluoroethylene (PTFE).

According to a preferred embodiment, the elastomer polymer is chosen from the group consisting of Styrene-Butadiene (SBR), Styrene-Isoprene (SI), Styrene-ethylene/butylene (SEB), Styrene-Isoprene/butylene (SIB), Styrene-ethylene/propylene (SEP), Styrene-Butadiene-Styrene (SBS), Styrene-Isoprene-Styrene (SIS), Styrene-ethylene/butylene-Styrene (SEBS), Styrene-Isoprene/butylene Styrene (SIBS) and Styrene-ethylene/propylene-Styrene (SEPS) and polystyrene acrylate (PSA).

According to an embodiment, the thickening polymer is chosen from the group consisting of carboxymethylcellulose (CMC), hydroxyethylcellulose (HEC), hydroxypropylcellulose (HPC), hydroxypropylmethylcellulose (HPMC), polyacrylic acid (PAAc), xanthane gum, polyvinyl alcohol PVA, polyvinyl butyral (PVB) and poly(ethylene oxide) (PEO).

According to an embodiment of the invention, the negative electrode comprises:
- between 60 and 95% by weight of activated carbon;
- between 3 and 20% by weight of electron-conducting additive; and
- between 1 and 10% by weight of elastomer polymer and between 1 and 10% by weight of thickening polymer.

According to an embodiment, the separator comprises a non-woven polypropylene material and optionally a membrane of polyethylene grafted by acrylic acid groups.

Another subject of the invention is a method for manufacturing an asymmetrical supercapacitor with alkaline electrolyte comprising the following steps:
a) providing a nickel-based current collector having a porous three-dimensional structure wherein:
   some pores are open, the mean diameter of the open pores being greater than or equal to 100 µm and being less than or equal to 300 µm; and
   two contiguous open pores communicate via at least one opening, the mean diameter of which is greater than or equal to 35 µm and less than or equal to 130 µm;
b) forming a paste by mixing activated carbon with at least one electron-conducting additive and a binding agent comprising at least one elastomer polymer, at least one thickening polymer and water;
c) depositing the paste obtained in step b) in the current collector of step a);
d) drying the current collector coated with the paste;

e) compressing or calendering the current collector coated with the paste to form a negative electrode;

f) providing at least one positive electrode comprising a nickel-based hydroxide and a nickel-based current collector;

g) providing at least one separator;

h) stacking at least one positive electrode, at least one separator and at least one negative electrode;

i) introducing the stack into a container; and j) filling the container with an alkaline electrolyte.

According to an embodiment of the invention, the manufacturing method makes it possible to obtain the asymmetrical supercapacitor according to the invention.

According to an embodiment of the invention, step c) of deposition of the paste in the current collector includes a step of immersion of the collector in a paste bath.

The current collector of the negative electrode according to the invention has a particular three-dimensional structure giving rise to an electrode having improved properties.

Specifically, the choice of a porous three-dimensional collector of dimensions chosen within a specific range makes it possible to have good adhesion of the active material to the current collector. This good adhesion improves the electrode lifetime and makes it possible to obtain a supercapacitor with better capacitance.

In addition, the carbonated bond layer improving the bonding of the active material with the current collector is dispensed with.

Given the better mechanical withstand, it is possible to reduce the proportion of binding agent and thus further increase the mass and also the volumetric capacitances of the electrode. By doing this, the foam technology electrode allows a gain in the mass capacitance of the electrode greater than 20% and a gain in volumetric capacitance in the order of above 5% relative to the direct collector of the patent application FR 11 54681.

The choice of a porous three-dimensional collector such as foam also allows a reduction in cost. For example, nickel metal foam is cheaper than the nickel direct collector with a specific bond layer.

Another advantage of the invention is that it supplies an asymmetrical supercapacitor comprising an electrode, the current collector of which is coated with a mixture comprising activated carbon, the electron-conducting additive and the PTFE-free binding agent.

The method for manufacturing the asymmetrical supercapacitor of the invention is simplified by comparison with that of a supercapacitor comprising a negative electrode wherein an activated carbon weave constitutes a part in itself that must be wound accordion-style around the current collector. The assembly of the electrochemical bundle of the invention is simplified since it is a conventional stack of plates.

Other features and advantages of the invention will become apparent on reading the following description of a preferred embodiment of the invention, given by way of example and with reference to the appended drawings.

EXPLANATION OF THE EMBODIMENTS OF THE INVENTION

The invention relates to an asymmetrical supercapacitor, also known as hybrid, comprising an alkaline electrolyte, at least one separator, at least one positive electrode and at least one negative electrode.

The electrolyte of the supercapacitor is chosen so as to be adapted to the compositions of the electrolytes. According to the invention, the electrolyte is an alkaline aqueous electrolyte, such as potassium hydroxide (KOH) and/or lithium hydroxide (LiOH) and/or sodium hydroxide (NaOH), preferably at a concentration greater than 5N in order to guarantee high ion conductivity. Preferably, the alkaline electrolyte is potassium hydroxide (KOH).

Furthermore, the separator is a separator currently used in the field of alkaline accumulators, such as those used in Ni—Cd battery systems. The separator can comprise a non-woven material made of polypropylene or polyethylene and optionally a membrane comprising polyethylene grafted by acrylic acid groups.

The positive electrode includes an active material mainly composed of nickel-based hydroxide and a nickel-based current collector. The term "nickel-based hydroxide" refers to a nickel hydroxide, a hydroxide containing mainly nickel, but also a nickel hydroxide containing at least one syncrystallized hydroxide of an element chosen for example from zinc (Zn), cadmium (Cd), magnesium (Mg) and aluminum (Al), and at least one syncrystallized hydroxide of an element chosen from cobalt (Co), manganese (Mn), aluminum (Al), yttrium (Y), calcium (Ca), zirconium (Zr), and copper (Cu). A syncrystallized hydroxide contained in nickel hydroxide is a hydroxide forming a solid solution with the nickel hydroxide, i.e. occupying, in a continually varying proportion, the atomic sites defined by the crystal lattice of the nickel hydroxide. For example, the current collector of this positive electrode includes a nickel sintering suitable for power applications, i.e. the discharge current can exceed 500 A for a single supercapacitor.

Figure 1:
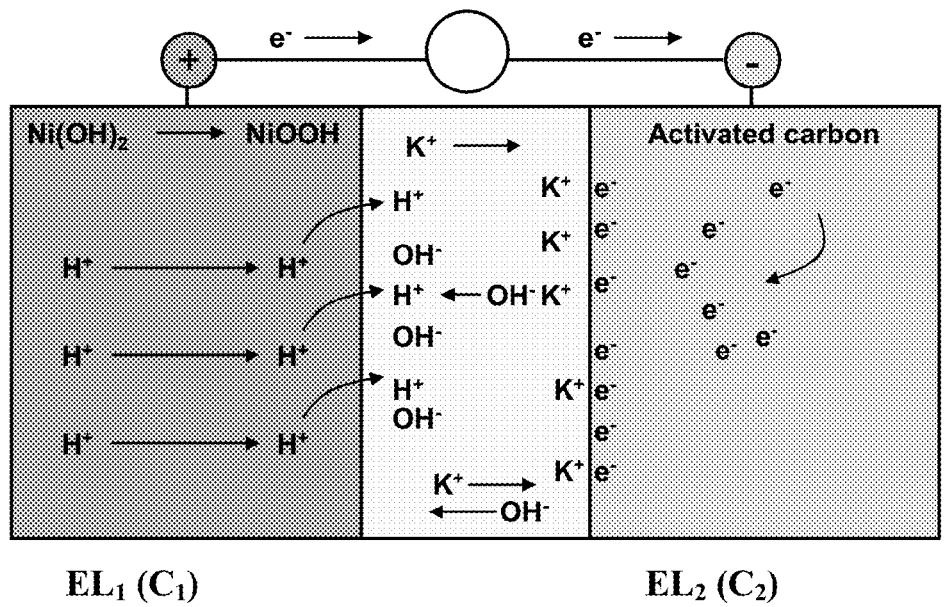
FIGS. 1 and 2 are schematic representations of the movement of the ions during the operation of an asymmetrical supercapacitor with a nickel-based hydroxide positive electrode and an alkaline electrolyte during a charge, then a discharge respectively.
Figure 2:
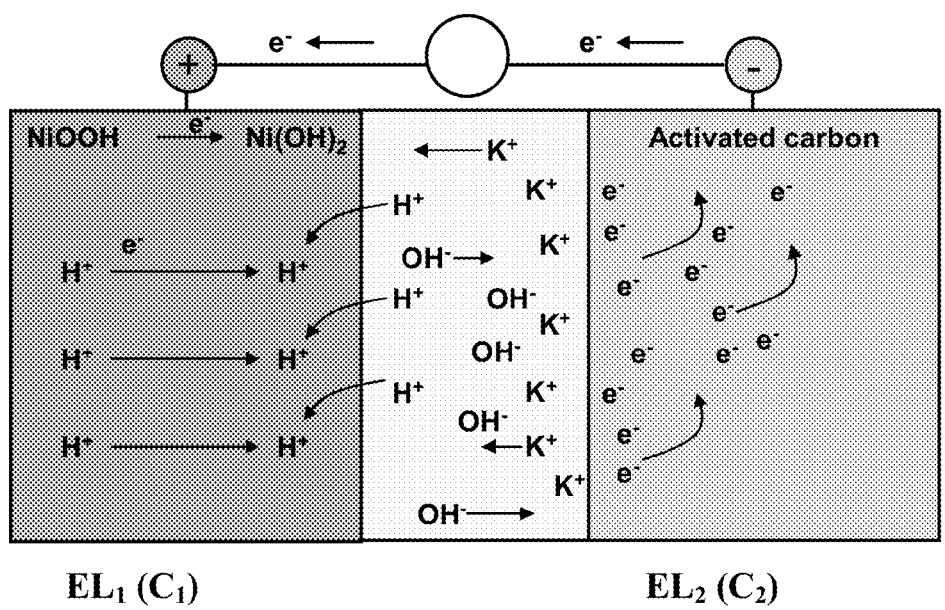
Figure 3:
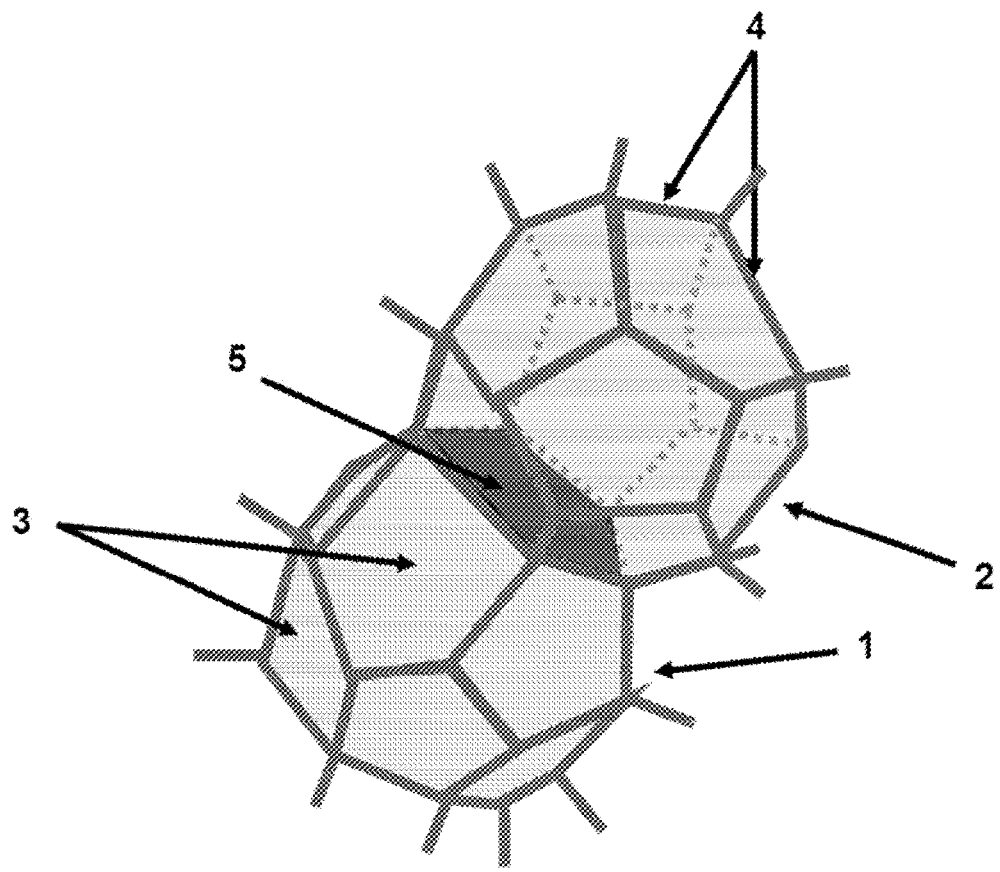
FIG. 3 is a schematic representation of an example of a three-dimensional porous structure of the current collector according to the invention.

The negative electrode comprises a carbon-based active material and a nickel-based current collector. The current collector of the negative electrode has a porous three-dimensional structure wherein:

some pores are open, the mean diameter of the open pores being greater than or equal to 100 μm and being less than or equal to 300 μm; and two contiguous open pores communicate by at least one opening, the mean diameter of which is greater than or equal to 35 μm and less than or equal to 130 μm;

FIG. 3 schematically represents a three-dimensional porous structure of the current collector of the negative electrode according to the invention. Two contiguous open pores, denoted 1 and 2, communicating with each other are represented in this FIG. 3. Each pore is schematized in the form of a polyhedron, i.e. a three-dimensional geometrical shape having polygonal planar faces 3 that meet along segments of line 4, which will be known here as strands or edges. The two contiguous pores 1 and 2 have several strands in common.

The strands common to the two polyhedrons define an opening 5 which puts the volume of one of the two open pores in communication with the volume of the contiguous open pore. This opening forms a passage through which a mixture or paste flows from one pore to another during the coating method, which allows for homogeneous filling of the pores of the current collector. The opening can be likened to a planar surface, an opening with a mean diameter that is greater than or equal to 35 μm and is less than or equal to 130 μm Preferably, the mean diameter of the open pores is between 150 μm and 250 μm and the mean diameter of the openings is between 50 μm and 100 μm.

In addition, the greatest dimension of an open pore is greater than the greatest dimension of the opening connecting this pore to a contiguous open pore.

Furthermore, the volume occupied by the open pores of the three-dimensional structure typically accounts for at least 50% of the volume of the current collector, preferably at least 90% of the volume of the current collector, and more preferably at least 95% of the volume of the current collector. Preferably the volume occupied by the open pores of the three-dimensional structure is above least 97% of the volume of the current collector.

The structure of the pore has been described with reference to a geometrical shape of polyhedron type but it is understood that the shape of the pore is not limited to this geometry and can also be of substantially spherical or ovoid shape, for example.

Similarly, the opening has been described as being a planar surface formed by a common planar face. However, the opening is not limited to a planar shape but can also be three-dimensional. The diameter of a pore can then be defined as the diameter of the equivalent sphere in terms of volume, and the diameter of an opening can be defined as the diameter of the equivalent circle in terms of surface area. The mean diameter of the pores then corresponds to the arithmetic mean of all the pores of the porous structure and the mean diameter of the openings corresponds to the arithmetic mean of all the openings of the porous structure.

Typically, the thickness of the current collector of the negative electrode is between 0.3 and 1.0 mm.

The density or basis weight of the current collector of the negative electrode has an effect on the thickness of the nickel strands delimiting the pores and consequently on the mechanical properties of the current collector and on its electrical conductivity.

According to the invention, the basis weight of the current collector of the negative electrode is between 3 and 6 g/dm$^2$. Below 3 g/dm$^2$, the rigidity of the current collector and its electrical conductivity can be inadequate for the desired supercapacitor format. For example, the resistance to stretching, the resistance to tearing and the resistance to welding become insufficient. Below 6 g/dm$^2$, the current collector may become too rigid and becomes expensive to fabricate.

Furthermore, the porous three-dimensional structure includes a mixture also known as paste, comprising:
at least one activated carbon;
at least one electron-conducting additive; and
a binding agent comprising at least one elastomer polymer and at least one thickening polymer.

The main components of the paste will now be described.

The electronically active material of the negative electrode is an activated carbon. According to the invention, the activated carbon is a bulk carbonated material consisting of particles of a diameter greater than 1 μm, preferably in the order of 2 to 20 μm and more preferably still greater than 10 μm. Preferably, the active material is not in the form of carbon nanotubes.

Preferably, the specific active surface area of the activated carbon is greater than or equal to 500 m$^2$/g and more preferably still greater than 900 m$^2$/g.

Preferably, the quantity of oxygen O contained in the activated carbon measured for example by X-ray fluorescence is greater than 3 atomic %.

The conducting additive can be chosen from among carbon black, graphite, graphene, carbon fibers, carbon nanotubes, or a mixture thereof in a proportion generally of 3 to 20% by weight.

The elastomer polymer may be chosen from the group comprising Styrene-Butadiene (SBR), Styrene-Isoprene (SI), Styrene-ethylene/butylene (SEB), Styrene-Isoprene/butylene (SIB), Styrene-ethylene/propylene (SEP), Styrene-Butadiene-Styrene (SBS), Styrene-Isoprene-Styrene (SIS), Styrene-ethylene/butylene-Styrene (SEBS), Styrene-Isoprene/butylene Styrene (SIBS) and Styrene-ethylene/propylene-Styrene (SEPS) and polystyrene acrylate (PSA).

A thickener in the context of the invention is defined as chemical component making it possible to multiply by 10 the viscosity of a component or in the context of the invention of the mixture or paste. Viscosity being measured using a rotating viscosimeter of the Brookfield type, the viscosity of the mixture is in the order of 300 Pa·s at 20° C. Thus, the thickening polymer may be chosen from among carboxymethylcellulose (CMC), hydroxyethylcellulose (HEC), hydroxypropylcellulose (HPC), hydroxypropylmethylcellulose (HPMC), polyacrylic acid (PAAc), xanthane gum, polyvinyl alcohol PVA, polyvinyl butyral (PVB) and poly(ethylene oxide) (PEO) without being limited thereto.

According to the invention, the binding agent is free of polytetrafluoroethylene (PTFE).

For example, the negative electrode of an asymmetrical supercapacitor according to the invention comprises:
between 60 and 95% by weight of activated carbon;
between 3 and 20% by weight of electron-conducting additive; and
between 1 and 10% by weight of elastomer polymer and between 1 and 10% by weight of thickening polymer.

The method for manufacturing an asymmetrical supercapacitor with an alkaline electrolyte according to the invention will now be described.

First of all, a nickel-based current collector having a porous three-dimensional structure as described previously is made available with the aim of manufacturing the negative electrode.

Next a paste is formed by mixing activated carbon with at least one electron-conducting additive and a binding agent comprising at least one elastomer polymer and at least one thickening polymer and water such as those described previously.

The paste is then placed in the current collector. During this pasting step, the current collector is coated with the paste composed of a mixture essentially comprising activated carbon, at least one component that is a good electronic conductor and a binding agent allowing both good adhesion of the paste to the current collector once dried and good consistency of the active material. For example, this step of placing the paste in the current collector includes a step of immersing the collector in a paste bath.

Furthermore, the method includes a step of drying the current collector coated with the paste, aiming to make the solvent that has been used to obtain the paste evaporate.

In addition, the method comprises a step of compressing or calendering the current collector coated with the paste to form a negative electrode. The aim of this calendering step is to adjust the porosity of the negative electrode. During this step, the current collector passes for example between two rolls exerting on each face of the electrode a force directed along the thickness of the current collector.

The coating method leads to an electrode with a structure that is different from that of an electrode comprising a two-dimensional current collector. Specifically, when a two-dimensional current collector, such as perforated or unperforated foil, is coated, the paste is deposited in the hollowed-out parts of the collector and on the surface of the solid parts of the collector. The thickness of the electrode is thus greater than the thickness of the current collector since it is necessary to take into account the paste thickness on the surface of the solid parts of the current collector. However, in the current collector according to the invention, there is no paste thickness above the surface of the current collector as the method makes it possible to fill the pores with paste.

Furthermore, the features of the current collector, such as its thickness of 0.3 to 1 mm, the mean pore diameter of 100 to 300 µm and the mean opening diameter of 35 to 130 µm are those of the negative electrode fabricated and ready to be combined with a separator and a positive electrode to fabricate an electrochemical bundle. They do not correspond to the current collector before coating. Specifically, the steps of coating and calendering compress the current collector and thus evenly reduce its thickness.

In addition, the mean diameter of the openings of 35 to 130 µm ensures good filling of the collector with respect to the features of the active material and the conducting additive, particularly their particle sizes and their developed surface areas, and also the mechanical features during fabrication of the electrode and during the process of discharging the material.

The sizes of the pores of the current collector have an effect on the pasting and the performance of the supercapacitor at a high discharge rate. Specifically, if the pores have a mean diameter less than or equal to 100 µm, the filling of the pores by the paste is limited. If the pores have a mean diameter greater than or equal to 300 µm, the performances in discharge under strong current are reduced as the mean distance of the active particles of active material in the current collector is too great.

Furthermore, the paste being introduced into the metallic three-dimensional structure of the current collector, the electrode has excellent mechanical withstand: there are no concerns about the adhesion of the material to the surface of the current collector. No specific roughness criterion is necessary.

The method for manufacturing the asymmetrical supercapacitor with alkaline electrolyte according to the invention continues with the provision of at least one positive electrode comprising a nickel-based hydroxide and a nickel-based current collector and at least one separator.

The asymmetrical supercapacitor is then assembled by conventional stacking of the various positive and negative electrodes and the separators so that one separator is inserted between a positive electrode and a negative electrode.

This stack is then placed in a container. The container is filled with an alkaline electrolyte either before or after placing the electrodes and the separators in the container.

The positive electrodes are connected with one another and form the positive current output terminal of the supercapacitor, and the negative electrodes are connected with one another and form the negative current output terminal of the supercapacitor.

The container is sealingly closed by a lid. In general, the lid bears the current output terminals.

Furthermore, the capacitance of the positive electrode is greatly in excess of the capacitance of the negative one.

Such an asymmetrical supercapacitor according to the invention can be used in various industrial applications, such as for example the field of rail applications, and the starting of diesel engines.

EXAMPLES

A hybrid supercapacitor with an alkaline electrolyte of the prior art has been produced. It comprises a negative electrode A of the supercapacitor obtained by coating an ink based on a powder of 80% of activated carbon, carbon black 10% and binding agent HPMC 5% and SBR 5% onto a rough current collector as described in the patent application FR 11 54681. The total thickness is 700 µm.

A supercapacitor according to the invention has been produced. It includes a negative electrode B obtained by pasting a paste based on a powder of activated carbon 82%, carbon black 10% and binding agent HPMC 5% and SBR 3%.

The paste is made according to the weight composition above. In an aqueous solution of HPMC accounting for 70% of the weight of the other components, are added in order: the carbon black, the SBR and the activated carbon, in order to obtain a paste of a viscosity between 200 and 2000 Pa·s at 20° C. This composition is then pasted into a nickel-based porous three-dimensional structure of initial thickness 1.6 mm, of a basis weight of 4.5 g/dm$^2$, and a porosity of 97%, prelaminated to the thickness of 1.1 mm to obtain the desired quantity of active material in the negative electrode. The mean diameter of the pores of the negative electrodes obtained is of 200 µm and the mean diameter of the openings is of 70 µm. Each negative electrode then undergoes drying to evaporate the solvent from the paste, here water, in an oven at 150° C. The electrodes are then laminated to obtain a final porosity of 70%. The final thickness of each negative electrode is of 700 µm.

Asymmetrical supercapacitors are then assembled using the negative electrodes A and B, surrounded by two positive electrodes separated by a separator made of non-woven polypropylene inserted between the electrodes. The stack is then placed in a plastic container. An alkaline electrolyte KOH at 7N is then introduced into the container. Finally, the container is sealingly closed by a lid. The capacitance of the positive electrodes is greatly in excess of the capacitance of the negative electrode.

The supercapacitors are charged at the temperature of 20° C. at a rate of 10 mA/cm$^2$ up to a voltage of 1.3 V, left at rest for 5 seconds, then discharged at a rate of 10 mA/cm$^2$ to a voltage of 0.3 V.

A measurement is then made of the capacitance of the supercapacitor and knowing the mass and the volume of the negative electrode, the mass and volumetric capacitances are calculated.

The results are illustrated in the following Table 1:

TABLE 1

|  | Asymmetrical supercapacitor with electrodes of type | |
|---|---|---|
|  | A | B |
| Volumetric capacitance (F/cm$^3$) | 67 | 70 |
| Mass capacitance (F/g) | 60 | 72 |

These results show that the negative electrode according to the invention has a volumetric capacitance 5% greater than that of the negative electrode obtained by coating the rough current collector as described in the patent application FR 11 54681. Its mass capacitance is greater by around +20%.

Thus, the invention makes it possible to increase the mass and volumetric capacitance while preserving excellent mechanical withstand of the electrode. Furthermore, the invention also makes it possible to reduce the fabrication cost of a supercapacitor since the nickel-based direct collector is around 3 times more expensive per m² than nickel metallic foam.

Electrodes C, D and E outside the field of the invention have been produced.

To do this, a paste of identical composition to that used to form the electrode B is made. This composition is then pasted into a nickel porous three-dimensional structure of an initial thickness of 1.6 mm, with a basis weight of 4.5 g/dm², and a porosity of 97%, prelaminated to the thickness of 1.1 mm to obtain the desired quantity of active material in the electrode.

For electrode C, the mean diameter of the pores of the current collector is of 380 μm and the mean diameter of the openings is of 100 μm.

For electrode D, the mean diameter of the pores of the current collector is of 120 μm and the mean diameter of the openings is of 30 μm.

For electrode E, the mean diameter of the pores of the current collector is of 280 μm and the mean diameter of the openings is of 180 μm.

The other steps of fabrication of the electrodes C, D and E and the corresponding supercapacitors are respectively identical to those of the electrode B and of the corresponding supercapacitor.

As before, the volumetric capacitance of the supercapacitors was measured. The results are illustrated in the following Table 2:

TABLE 2

|  | Asymmetrical supercapacitor with electrodes of type | | | |
| --- | --- | --- | --- | --- |
|  | B | C | D | E |
| Mean diameter of the pores (μm) | 200 | 380 | 120 | 280 |
| Mean diameter of the openings (μm) | 70 | 100 | 30 | 180 |
| Volumetric capacitance (F/cm³) | 70 | 64 | 45 | 12 |

The volumetric capacitance of the supercapacitor of type C is of 64 F/cm³, i.e. less than the volumetric capacitance of the supercapacitor of type B which is of 70 F/cm³. It is therefore understood that when the size of the pores of the three-dimensional structure is too great, the distance from the activated carbon particles to the current collector becomes too great and the electrical performance is degraded.

The volumetric capacitance of the supercapacitor of type D is of 45 F/cm³, which is less than the volumetric capacitance of the supercapacitor of type B which is of 70 F/cm³. It is therefore understood that when the size of the openings is too small, the penetration of the paste into the electrode becomes difficult, and that the quantity of active material is reduced. A drop in the density of active material deposited on the current collector of 35% was observed compared to that for the supercapacitor of type B. This results in a degradation of electrical performance.

The volumetric capacitance of the supercapacitor of type E is of 12 F/cm³, which is far less than the volumetric capacitance of the supercapacitor of type B which is of 70 F/cm³. It is therefore understood that when the size of the openings is too large, the mechanical properties of the electrode are reduced and lead to the expulsion of active material during charging and discharging if its particles are too small in size compared with the size of the openings. This probably leads to the presence of particles in the separator, bringing about the creation of micro-short circuits between the positive electrode and the negative electrode, and consequently reduced electrochemical performance.

The invention claimed is:

1. A hybrid supercapacitor comprising:
   an alkaline electrolyte;
   at least one separator;
   at least one positive electrode comprising a nickel-based hydroxide and a nickel-based current collector; and
   at least one negative electrode comprising a nickel-based current collector, said current collector of the negative electrode being made of a porous three-dimensional structure
   wherein:
   some pores are open, the mean diameter of the open pores being greater than or equal to 100 μm and being less than or equal to 300 μm; and
   two contiguous open pores (1, 2) communicate by at least one opening (5) the mean diameter of which is greater than or equal to 35 μm and less than or equal to 130 μm;
   said porous three-dimensional structure is coated with a mixture comprising:
   at least one activated carbon;
   at least one electron-conducting additive; and
   a binding agent comprising at least one elastomer polymer and at least one thickening polymer.

2. The hybrid supercapacitor according to claim 1, wherein the volume occupied by the open pores accounts for at least 50% of the volume of the current collector, preferably at least 90% of the volume of the current collector, preferably at least 95% of the volume of the current collector.

3. The hybrid supercapacitor according to claim 1, wherein the current collector of the negative electrode has a thickness between 0.3 and 1 mm.

4. The hybrid supercapacitor according to claim 1, wherein the greatest dimension of an open pore (1, 2) is greater than the greatest dimension of the opening (5) connecting this pore to a contiguous open pore.

5. The hybrid supercapacitor according to claim 1, wherein the current collector of the negative electrode has a basis weight between 3 g/dm² and 6 g/dm².

6. The hybrid supercapacitor according to claim 1, wherein the mean diameter of the open pores (1, 2) is between 150 μm and 250 μm and the mean diameter of the openings (5) is between 50 μm and 100 μm.

7. The hybrid supercapacitor according to claim 1, wherein the activated carbon has a specific active surface area greater than or equal to 500 m²/g, preferably greater than or equal to 900 m²/g.

8. The hybrid supercapacitor according to claim 1, wherein the activated carbon is in the form of particles of a diameter between 2 and 20 μm.

9. The hybrid supercapacitor according to claim 1, wherein the activated carbon includes a quantity of oxygen measured by X-ray fluorescence greater than 3 atomic %.

10. The hybrid supercapacitor according to claim 1, wherein the electron-conducting additive is chosen from the group consisting of carbon black, graphite, graphene, carbon fibers, carbon nanotubes and a mixture thereof.

11. The hybrid supercapacitor according to claim 1, wherein the binding agent is free of polytetrafluoroethylene (PTFE).

12. The hybrid supercapacitor according to claim 1, wherein the elastomer polymer is chosen from the group consisting of Styrene-Butadiene (SBR), Styrene-Isoprene (SI), Styrene-ethylene/butylene (SEB), Styrene-Isoprene/butylene (SIB), Styrene-ethylene/propylene (SEP), Styrene-Butadiene-Styrene (SBS), Styrene-Isoprene-Styrene (SIS), Styrene-ethylene/butylene-Styrene (SEBS), Styrene-Isoprene/butylene Styrene (SIBS) and Styrene-ethylene/propylene-Styrene (SEPS) and polystyrene acrylate (PSA).

13. The hybrid supercapacitor according to claim 1, wherein the thickening polymer is chosen from the group consisting of carboxymethylcellulose (CMC), hydroxyethylcellulose (HEC), hydroxypropylcellulose (HPC), hydroxypropylmethylcellulose (HPMC), polyacrylic acid (PAAc), xanthane gum, polyvinyl alcohol PVA, polyvinyl butyral (PVB) and poly(ethylene oxide) (PEO).

14. The hybrid supercapacitor according to claim 1, wherein the negative electrode comprises:
between 60 and 95% by weight of activated carbon;
between 3 and 20% by weight of electron-conducting additive; and
between 1 and 10% by weight of elastomer polymer and between 1 and 10% by weight of thickening polymer.

15. A method for manufacturing a hybrid supercapacitor with an alkaline electrolyte comprising the following steps:
a) providing a nickel-based current collector, said current collector of the negative electrode being made of a porous three-dimensional structure wherein:
some pores are open, the mean diameter of the open pores being greater than or equal to 100 μm and being less than or equal to 300 μm; and
two contiguous open pores (1, 2) communicate via at least one opening (5) the mean diameter of which is greater than or equal to 35 μm and less than or equal to 130 μm;
b) forming a paste by mixing activated carbon with at least one electron-conducting additive and a binding agent comprising at least one elastomer polymer and at least one thickening polymer and water;
c) depositing the paste obtained in step b) in the current collector of step a);
d) drying the current collector coated with the paste;
e) compressing or calendering the current collector coated with the paste to form a negative electrode;
f) providing at least one positive electrode comprising a nickel-based hydroxide and a nickel-based current collector;
g) providing at least one separator;
h) stacking at least one positive electrode, at least one separator and at least one negative electrode;
i) introducing the stack into a container; and
a) filling the container with an alkaline electrolyte.

* * * * *